United States Patent
Hermes et al.

(10) Patent No.: US 10,961,409 B2
(45) Date of Patent: *Mar. 30, 2021

(54) AQUEOUS BINDERS FOR HEAT-SEALING APPLICATIONS

(71) Applicant: Evonik Operations GmbH, Essen (DE)

(72) Inventors: Florian Hermes, Frankfurt (DE); Dominik Sturm, Riedstadt (DE); Christian Golditz, Bad Soden Salmuenster (DE); Michael Wicke, Seeheim-Jugenheim (DE); Herbert Jung, Karlstein (DE); Juergen Hartmann, Darmstadt (DE); Bruno Keller, Wackernheim (DE)

(73) Assignee: Evonik Operations GmbH, Essen (DE)

( * ) Notice: Subject to any disclaimer, the term of this patent is extended or adjusted under 35 U.S.C. 154(b) by 80 days.

This patent is subject to a terminal disclaimer.

(21) Appl. No.: 16/116,596

(22) Filed: Aug. 29, 2018

(65) Prior Publication Data

US 2018/0371285 A1    Dec. 27, 2018

Related U.S. Application Data

(63) Continuation of application No. 14/418,288, filed as application No. PCT/EP2013/068471 on Sep. 6, 2013, now Pat. No. 10,155,878.

(30) Foreign Application Priority Data

Oct. 4, 2012  (DE) .................... 10 2012 218 108.3

(51) Int. Cl.
  *C23C 26/00* (2006.01)
  *C09D 133/02* (2006.01)
  *C08F 265/06* (2006.01)
  *C09D 151/06* (2006.01)

(52) U.S. Cl.
  CPC .......... *C09D 133/02* (2013.01); *C08F 265/06* (2013.01); *C09D 151/06* (2013.01); *C23C 26/00* (2013.01)

(58) Field of Classification Search
  CPC .......... C23C 26/00; C09D 133/02; B05D 1/00
  See application file for complete search history.

(56) References Cited

U.S. PATENT DOCUMENTS

| 4,196,070 | A | 4/1980 | Chao |
| 5,349,025 | A | 9/1994 | Siol |
| 5,385,967 | A * | 1/1995 | Bauer ............... C09J 125/08 524/458 |
| 6,194,514 | B1 | 2/2001 | Scheuermann et al. |
| 6,258,887 | B1 * | 7/2001 | Bardman ........... C08F 263/04 524/521 |
| 2001/0025077 | A1 * | 9/2001 | Scheuermann ..... C08F 265/06 524/458 |
| 2004/0142190 | A1 * | 7/2004 | Kawai ............. H01M 2/1094 428/461 |
| 2011/0081512 | A1 | 4/2011 | Noda | |

FOREIGN PATENT DOCUMENTS

| EP | 0 574 803 | 12/1993 |
| EP | 1 008 635 | 6/2000 |
| JP | 10-265534 A | 10/1998 |

OTHER PUBLICATIONS

International Search Report dated Jan. 15, 2014 in PCT/EP13/068471 filed Sep. 6, 2013.

* cited by examiner

*Primary Examiner* — Hai Y Zhang

(74) *Attorney, Agent, or Firm* — Oblon, McClelland, Maier & Neustadt, L.L.P.

(57) ABSTRACT

The present invention relates to aqueous binders and to heat-sealing lacquers produced therefrom for heat-sealable coatings which adhere on aluminium without use of any primer, permit good sealability of the coated aluminium foil with respect to PS and/or PVC, and moreover feature good blocking resistance even at temperatures above 40° C.

12 Claims, No Drawings

AQUEOUS BINDERS FOR HEAT-SEALING APPLICATIONS

CROSS-REFERENCE TO RELATED APPLICATIONS

This application is a Continuation of U.S. Non-Provisional application Ser. No. 14/418,288, which was filed on Jan. 29, 2015. U.S. Non-Provisional application Ser. No. 14/418,288 is a National Stage of PCT/EP2013/068471, which was filed on Sep. 6, 2013. This application is based upon and claims the benefit of priority to German Application No. 10 2012 218 108.3, which was filed on Oct. 4, 2012.

FIELD OF THE INVENTION

The present invention relates to aqueous binders and to heat-sealing lacquers produced therefrom for heat-sealable coatings which adhere on aluminium without use of any primer, permit good sealability of the coated aluminium foil with respect to PS and/or PVC, and moreover feature good blocking resistance even at temperatures above 40° C.

It is now already some years since heat-sealing systems for the coating of aluminium fools with respect to PS surfaces, PVC surfaces or PP surfaces became established coating compositions in the food-and-drink industry. Heat-sealing coatings of this type are found on yoghurt pot lids and also on the inner side of blisters, e.g. for medicaments. Most established systems are based on organic solutions or organic dispersions. It is therefore already some years since interest began in the development of an aqueous heat-sealing lacquer.

PRIOR ART

U.S. Pat. No. 6,194,514 explicitly describes aqueous two-layer systems composed of a primer on aluminium and of a second layer of an aqueous binder on the dried primer. An example of a primer described is an aqueous poly(meth)acrylate dispersion which is composed of two copolymers. One of the said copolymers here comprises from 2 to 10% by weight of glycidyl- or hydroxyl-functional monomers, and the other copolymer comprises from 2 to 10% by weight of acrylic or itaconic acid. EP 0 417 570 discloses an aqueous copolymer dispersion for the sealing of abovementioned materials. This copolymer is composed of at least 70% by weight of methacrylates with C1- to C4-alkyl esters, and of at least one functional monomer from the group of the acrylamides, methacrylamides, aminoalkyl acrylates or aminoalkyl methacrylates. Although these systems exhibit excellent heat sealing strengths, they function exclusively as two-layer systems and need markedly longer staving the lacquers than established solvent-based systems.

DE 3921256 describes an aqueous polymer dispersion as heat-sealing lacquer. Here, secondary dispersions are produced from solution polymers with addition of water and ammonia and with subsequent distillative removal of the solvent. This process is very complicated. It is moreover very difficult to achieve realty complete removal of the solvent residues, and this can in particular be disadvantageous in applications in contact with food or drink.

EP 0 574 603 describes aqueous dispersions for sealable coatings which comprise two copolymers with glass transition temperatures of from 50 to 150° C. and from −50 to 50° C. One of the two copolymers here has from 3 to 70% by weight content of acid-functional monomers. However, these systems do not have a good combination of blocking resistance and heat-seal-seam strength. The expression blocking resistance here means the undesired adhesion of the heat-sealing lacquer to a second aluminium foil or to a second lacquer-coated aluminium foil at temperatures below the sealing temperature. Blocking resistance is significant in particular in relation to the storage of coated aluminium foils.

WO 2011/017388 describes an aqueous dispersion for heat-sealable coatings, comprising a first copolymer with a glass transition temperature $T_g$ of from −60 to 0° C., and from 0.2 to 10% by weight of an ethylenically unsaturated acid or anhydride thereof. A second, hard copolymer with a glass transition temperature of from 50 to 120° C. is also present. Again, these systems do not have an adequate combination of blocking resistance and heat-seal-seam strength.

U.S. Pat. No. 6,368,707 describes heat-sealable substrates composed of a copolymer dispersion in which a (meth)acrylate-based polymer with a glass transition temperature of at most −10° C. produced by, means of emulsion polymerization is present with a copolymer with a glass transition temperature above 20° C., which is a water-soluble or water-dispersible copolymer having carboxy groups neutralized by a base. There is no description of sealability in respect of aluminium.

Object

In the light of the prior art, it was an object of the present invention to develop a novel process for the coating of aluminium foils with an aqueous binder dispersion as heat-sealing lacquer and for the sealing of the aluminium foil with respect to PS or PVC.

In particular, it was an object of the present invention to develop a corresponding binder with which heat-seal-seam strengths of at least 5 N/15 mm can be achieved after application without primer.

Very particularly, it as an object of the present invention to provide a heat-sealing process which uses aqueous dispersions and which exhibits reasonable drying times and which after sealing, exhibits good blocking resistance.

Another object of the present invention was to develop a process which uses an aqueous binder dispersion which is free from organic solvents and which can be produced without the use of such solvents. In particular, it was an object of the present invention to provide an aqueous binder dispersion which also functions without addition of ammonia.

A particular object of the invention was that when aluminium is sealed with respect to polystyrene the fracture site is on the polystyrene side.

Other objects not explicitly mentioned can be derive description and the examples, or directly from the prior art.

Achievement of Objects

The objects are achieved via the novel use of aqueous dispersion in a heat-sealing lacquer for the sealing of aluminium surfaces which respect to styrene, PET, PLA (polylactic acid) or PVC. This heat-sealing lacquer is composed of at least 50% by weight, preferably from 70 to 95% by weight, of the said aqueous dispersion.

This aqueous dispersion used according to the invention comprises a first polymer phase with a glass transition temperature of from −20 to 30° C., preferably from −10 to 25° C., particularly preferably from −5 to 5° C., and a second polymer phase with a glass transition temperature of from 20 to less than 50° C., preferably from 30 to 45° C. The second polymer phase here comprises, based on the entirety of the two polymer phases, from 2 to 10% by weight of acids copolymerizable with methacrylates.

It is preferable that the heat-sealing lacquer is applied in a single layer to the aluminium surface before the sealing process. The aqueous dispersion present here preferably comprises from 15 to 64% by weight of a polymer or polymers. These in turn preferably comprise from 25 to 78% by weight, particularly from 37 to 70% by weight, in particular from 49 to 65% by weight, of an alkyl ester of methacrylic acid, from 4 to 40% by weight, particularly from 12 to 35% by weight and in particular from 17 to 30% by weight, of an alkyl ester of acrylic acid, from 2 to 9% by weight, particularly from 3 to 8% by weight, of an acid which is copolymerizable with methacrylates and which preferably involves (meth)acrylic acid, and up to 20% by weight, particularly from 4 to 20% by weight and very particularly from 8 to 15% by weight, of another monomer which is copolymerizable with (meth)acrylates but which is not itself a (meth)acrylate, and which preferably involves styrene.

The polymer(s) in the dispersion can moreover also comprise from 2 to 12% by weight, preferably from 3 to 7% by weight and particularly preferably from 4 to 6% by weight, of an alkyl ester of (meth)acrylic acid having at least one other functional group. This alkyl ester of (meth)acrylic acid having at least one other functional group preferably involves hydroxyethyl (meth)acrylate.

In this connection, the expression (meth)acrylic acid means methacrylic acid, acrylic or a mixture of these. Corresponding considerations apply to the expression (meth)acrylate, which comprises either methacrylates or acrylates or a mixture of these. In contrast, each of the expressions acrylate and methacrylate means precisely that.

In particular, the present invention provides the use of an aqueous dispersion in a heat-sealing lacquer where the entirety of the polymers in the said dispersion are composed of from 25 to 78% by weight, preferably from 37 to 70% by weight, particularly preferably from 49 to 65% by weight, of methyl methacrylate and/or butyl methacrylate, from 4 to 40% by weight, particularly preferably from 12 to 35% by weight, with particular preference from 17 to 30% by weight, and very particularly preferably from 20 to 30% by weight, of a $C_1$-$C_4$-alkyl ester of acrylic add, from 3 to 7% by weight, preferably from 4 to 6% by weight, of a hydroxy-functional (meth)acrylate which with particular preference involves hydroxyethyl acrylate, from 2 to 9% by weight, preferably from 5 to 7% by weight, of (meth)acrylic acid, which particularly preferably involves a mixture of acrylic acid and methacrylic acid, and from 4 to 20% by weight, preferably from 8 to 15% by weight, of styrene.

It is preferable that the aqueous dispersion is produced by means of emulsion polymerization. A first monomer mixture here which leads to a polymer with a glass transition temperature of from −20 to 30° C. is used as initial charge and, after polymerization of this monomer mixture, a second monomer mixture which leads to the polymer with glass transition temperature of from 20 to less than 50° C. added, and polymerized.

It s particularly preferable that the first monomer mixture here comprises the hydroxy-functional (meth)acrylates and that the second monomer mixture comprises the carboxylic acids copolymerizable with (meth)acrylates. The ratio by weight here of the two monomer mixtures to one another is from 1:9 to 8:2.

In particular, the second monomer mixture can be polymerized to completion with the aid of a chain-transfer agent, preferably 0.2% by weight of n-DDM (n-dodecyl mercaptan), based on the monomers.

In particular, the emulsion polymerization is carried out in an aqueous phase in the presence of anionic, cationic or non-ionic emulsifiers known per se and of at least one free-radical-generating initiator in a two-stage reaction. The conduct of this type of emulsion polymerization can be found by way of example in H. Rauch-Puntigam, Th. Völker Acryl-und Methacrylverbindungen [Acrylic and methacrylic compounds], Springer-Verlag 1967, pp. 217-230. The first polymerization stage here is carried out by means of a feed process where, once a certain temperature has been reached, the initiator, in particular inorganic peroxides such as potassium peroxodisulphate or ammonium peroxodisulphate (PPS, APS), preferably dissolved in water, is added to an initial charge made of deionized water and emulsifier in a suitable reaction vessel equipped with stirrer and heating system. The content of initiator in the initial charge is by way of example in the range from 0.01 mol % to 2 mol %, based on the monomers in the feed in the first stage.

Amounts used of ionic emulsifiers are from 0.01 to 2.0% by weight, based on the entire amount of monomer, and those that can be used are in particular anionic emulsifiers. An example here is AEROSOL OT75® from Cyanamid BV, REWOPOL SB DO 75 from Evonik Tego Chemie GmbH or Dowfax 2A1 from Dow Europa SA. The mixture characterized as feed above is added thereto over a certain period, e.g. within 2 hours, in a first stage of the feed process. By way of example, feed 1 comprises from 20 to 60% by weight of the entire amount of water together with the monomers of the first stage.

After first-stage polymerization, stirring can also be continued for a certain period, for example for a period of one hour, at elevated temperature, e.g. at 80° C. The mixture can then be cooled, for example to 30° C., before feed of the second monomer composition is begun. This second feed can by way of example proceed over a period of 30 min. It can then be advantageous to allow the mixture to swell over a prolonged period, by way of example 4 hours, before heating to the second polymerization temperature of, for example, 40° C. and again adding initiators. It is preferable here to use redox initiators. Examples here are peroxodisulphates, dithionites and iron sulphate. After the addition, an exothermic reaction is observed, and once this stage has been reached the temperature is raised, e.g. to 80° C. Finally, stirring is continued by way of example for 2 hours in order to complete the polymerization. As an alternative, the second polymerization stage can also be a feed polymerization, e.g. over a period of 2 hours.

Another possibility, as an alternative to the use of ionic emulsifiers, is the addition of from 0.01 to 5.0% by weight of non-ionic emulsifiers, e.g. ethoxylated alcohols or methacrylic esters of methoxy polyethylene glycols, for example Carbowax 550, or alkylphenols. It is also possible to use a combination of ionic and non-ionic emulsifiers.

In an optional use of the dispersion of the invention, small amounts of ammonia are added thereto in order to adjust pH before the sealing process. This embodiment can achieve improved colloidal stability and improved coating properties.

The resultant dispersion can generally be used directly as it stands for the coating process. In particular instances, limited amounts of thickeners, antiblocking agents or film-formation aids can be added. The coating can be applied by spraying, spreading, casting, dip-coating, doctoring or rolling. Application thickness on the aluminium foil is generally such that drying gives a layer of from 2 to 10 µm.

Another possibility is the use of the aqueous dispersion of the invention with addition of an organic solution made of a polymethacrylate, e.g. in, the form of a dissolved suspension polymer, e.g. DEGALAN® P 24 from Evonik industries. Another alternative is the addition of aqueous methacrylate dispersions according to EP 0 417 570A1, for example DEGALAN® 4032 D from Evonik industries, to the dispersion of the invention.

In another possible application, the dried coating produced by means of the dispersion of the invention can also be coated with a layer of a binder according to EP 0 417 570A1, e.g. DEGALAN® 4032 D, for a further improvement in blocking resistance and water resistance. However, this optional application is not preferred because this procedure would lose the advantage of a single-layer heat-sealing layer, and the dispersions of the invention intrinsically give very good heat-sealing properties.

In practice, the drying of the coated aluminium foil is advantageously undertaken in a drying oven or in a continuous drying tunnel, optionally at reduced pressure and at temperatures of from 100 to 240° C. The required drying time generally becomes shorter as the drying temperature increases, and is by way of example from 5 sec to 5 min. Multiple application is, optionally also possible. The aqueous dispersions are preferably suitable for application to on-porous, coherent substrate surfaces, for example those of plastics foils or in particular of metal foils, for example aluminium foils or iron.

Heat-sealing generally requires that the glass transition temperature of the poly(meth)acrylate is exceeded in the coating. The shorter the contact time and the poorer the heat transfer through the substrate layer, the greeter the extent to which the temperature of the heat-sealing process has to be above the required sealing temperature. Thin metal foils exhibit very good heat transfer and allow the temperature of the heat-sealing jaws to be only slightly above the melting point of the poly(meth)acrylate, although in practice markedly higher heat-sealing temperatures are mostly selected, e.g. from 100 to 240° C., in order to maximize sealing rate. The glass transition temperature of a plastics substrate can restrict the heat-sealing temperature. In order to achieve high-strength sealing, pressure of at least 1 kp/cm$^2$, preferably from 3 to 6 kp/cm$^2$, should be applied during the heat-sealing process.

For the purposes of the present invention, the seal seam strength of the heat-sealing specimens is tested in accordance with DIN 51 221.

The examples below serve to illustrate the invention.

EXAMPLES

Production Specifications for Inventive Examples 1-11 and Comparative Examples 1 and 3

Inventive Example 9 provides a detailed description of the synthesis method and of the nature of the starting materials used. Inventive Example 9 differs from Inventive Examples 1-8, inventive Examples 10 and 11, and also Comparative Examples 1 and 3, in monomer composition of the first and second stage, which can be found in table 1, and also in the distribution of some of the starting materials, amounts of which can be calculated as follows: all of the polymerization processes were conducted in two stages, in each case distributing 520 g of monomer over the two stages. Emulsifier content is 0.52%, of which 52.4% are used in the first stage and 47.6% in the second stage. 10% of the emulsifier for the first stage here are used in the initial charge in the reactor, and 90% are used in the emulsion. The emulsions are in each case mixed with 34% by weight water content. The amount of initiator used is 0.09505 mol % of ammonium persulphate (APS), based on the monomers of the first stage. A further amount of 0.1062 mol % of initiator, based on the monomers of the second stage, is added to the second-stage emulsion.

Production Specification for Inventive Example 9

224 g of deionized water and 0.19 g of Rewopol SBDO 75 emulsifier are weighed into a 1 litre round-bottomed Quickfit flask with Quickfit lid, thermometer and stirrer, and are heated to an internal temperature of about 80° C. in a water bath, with stirring (150 rpm). The first-stage emulsion was produced by, weighing 1.70 g of Rewopol SBDO 75, 36.40 g of hydroxyethyl acrylate, 162.0 g of MMA, 165.6 g of n-butyl acrylate and 188.0 g of deionized water into a Woulff bottle and stirring this mixture for 5 min, leaving it to stand for 1 min and then stirring for a further 15 min.

The initial charge in the reactor is heated to an internal temperature of 80° C. and then 7.0 mL of APS (10% by weight) are added and incorporated by stirring for 5 min. The emulsion is metered at a metering rate of 3.3 g/min for three minutes. A slight temperature rise occurs here, and the metering is interrupted for 4 min. The rest of the emulsion is now metered at a metering rate of 3.3 g/min, and on completion stirring continued for 20 min.

The second-stage emulsion is produced by weighing 1.72 g of Rewopol SBDO 75 emulsifier, 15.6 g of acrylic acid, 31.2 g of styrene, 109.2 g of n-butyl methacrylate and 81 g of deionized water into a Woulff bottle, stirring the mixture for 5 min, leaving it to stand min and then again stirring for 15 min. 3.1 g of ammonium persulphate are added to this mixture and incorporated by vigorous stirring.

Once the reaction time for the first stage has expired, the second stage is metered into a mixture at a metering rate of 3.3 g/min, and this is followed by 60 minutes of continued-reaction time. The dispersion is cooled and then filtered through a 150 µm sieve.

Production Specification for Comparative Example CE2

Comparative Example CE2 was produced in accordance with the prior art of WO2011017388, Example 2.
Foil Material Used
High-flexibility aluminium foils of thickness 38 µm and PS and PVC foils of thickness 500 µm were used.
Laboratory Application of Heat-Sealing Dispersion
A K Hand coater No. 3 was used to apply the aqueous binder.
Laboratory Drying of Coated Foils
Directly after application of the aqueous binder, the foils were dried at 180° C. in convection oven for 15 seconds.
Heat-Sealing and Determination of Seal Seam Strength
Heat sealing equipment from LOWA GmbH was used to produce the seals.
Sealing Condition
Temperature: 180° C.
Pressure: 3 bar
Time: 1 sec.
Sealing area: 10×100 mm
Seal seam strength was determined by cutting specimens into strips of width 15 mm and subjecting these t tension at a velocity of 100 mm/min., in an Instron 1195 or Zwick 1454 tensile tester. During tensile testing, care as taken to ensure that the angle between the separated parts of the foils and the remainder not yet subjected to stress was 90°.

Exposure to Water

The water resistance of the lacquer was determined by placing the sealed strips in mains water for 48 h, and then drying them and determining heat sealing strength as described above.

Determination of Blocking Point

Blocking point was determined by using the heat-sealing equipment described above, but after replacement of one of the heated jaws by an unheated rubber jaw. The lacquered sides of two lacquered aluminium strips (prepared as described above) were pressed against one another at a defined temperature under a pressure of one bar for 30 seconds in the equipment. The blocking point is the temperature at which the aluminium strips remain adhering to one another when only one of the strips is held. At lower the weight of the aluminium strips is sufficient to separate these from one another. Measurements were made at intervals of 5° C.

TABLE 1

Compositions and production process for Inventive Examples 1-9

| | Proportion of | Stage 1 | | | Stage 2 | | | | |
|---|---|---|---|---|---|---|---|---|---|
| Specimen | Stage 1 in % | MMA | n-BA | HEA | BMA | AA | Styrene | n-DDM | TGA |
| Inv. Ex. 1 | 50 | 57 | 33 | 10 | 70 | 10 | 20 | | |
| Inv. Ex. 2 | 60 | 44.5 | 45.5 | 10 | 69.8 | 10 | 20 | 0.2 | |
| Inv. Ex. 3 | 50 | 44.5 | 45.5 | 10 | 70 | 10 | 20 | | |
| Inv. Ex. 4 | 60 | 44.5 | 45.5 | 10 | 80 | 10 | 10 | | |
| Inv. Ex. 5 | 60 | 44.5 | 45.5 | 10 | 69.8 | 10 | 20 | | 0.2 |
| Inv. Ex. 6 | 50 | 48 | 52 | | 70 | 10 | 20 | | |
| Inv. Ex. 7 | 50 | 48 | 42 | 10 | 70 | 10 | 20 | | |
| Inv. Ex. 8 | 30 | 44.5 | 45.5 | 10 | 70 | 10 | 20 | | |
| Inv. Ex. 9 | 70 | 44.5 | 45.5 | 10 | 70 | 10 | 20 | | |

MMA: Methyl methacrylate;

n-BA: n-butyl acrylate;

HEA: 2-hydroxyethyl acrylate;

BMA: n-butyl methacrylate;

AA: acrylic acid;

n-DDM: n-dodecyl mercaptan;

TGA: thioglycolic acid

TABLE 2

Composition and production process for Comparative Examples 1-3 and Inventive Examples 10-11

| | Proportion of | Stage 1 | | | | | | Stage 2 | | | |
|---|---|---|---|---|---|---|---|---|---|---|---|
| Specimen | Stage 1 in % | MMA | BMA | EA | AA | BA | HEA | MMA | BMA | Styrene | EHMA | AA |
| CE1 | 50 | 44.5 | | | | 45.5 | 10 | 70 | 10 | | 10 | 10 |
| CE2 | see WO2011017388, Example 2 | | | | | | | | | | | |
| CE3 | 30 | 70 | 20 | | 10 | | | 70 | 10 | 20 | | |
| IE10 | 60 | 24 | | 66 | | | 10 | 70 | 10 | 20 | | |
| IE11 | 15 | 44.5 | | | 0 | 45.5 | 10 | 0 | 70 | 20 | 0 | 10 |

MMA: methyl methacrylate;

EA: ethyl acrylate;

BA: n-butyl acrylate;

HEA: 2-hydroxyethyl acrylate;

BMA: n-butyl methacrylate;

AA: acrylic acid;

n-DDM: n-dodecyl mercaptan;

TGA: thioglycolic acid;

EHMA: ethylhexyl methacrylate

TABLE 3

Properties of binders produced in Inventive Examples 1-11 and Comparative Examples 1-3

| Specimen | HSF v PS [N/15 mm] | | HSF v PS H₂O | | HSF v PVC [N/15 mm] | | HSF v PVC H₂O | | Blocking point [° C.] | Ps [nm] | Tg Stage 1 [° C.] | Tg Stage 2 [° C.] |
| | | Fracture site | | Fracture site | | Fracture site | | Fracture site | | | | |
|---|---|---|---|---|---|---|---|---|---|---|---|---|
| IE 1 | 6 | PS | nd | nd | <1 | partial | nd | nd | 50 | 146 | 20 | 41 |
| IE 2 | 8 | PS | 8 | PS | 7 | Al | 8 | partial | 45 | 161 | 0 | 41 |
| IE 3 | 7 | PS | nd | nd | 6 | Al | nd | nd | 45 | 172 | 0 | 41 |
| IE 4 | 7 | PS | nd | nd | 6 | Al | nd | nd | 40 | 145 | 0 | 34 |
| IE 5 | 8 | PS | 8 | partial | 6 | Al | 5 | partial | 45 | 143 | 0 | 41 |
| IE 6 | 2 | PS | nd | nd | 5 | Al | nd | nd | 45 | 150 | 0 | 41 |
| IE 7 | 7 | PS | nd | nd | 5 | partial | nd | nd | 45 | 124 | 5 | 41 |
| IE 8 | 7 | PS | 7 | PS | 2 | partial | 6 | partial | 50-55 | 181 | 0 | 41 |
| IE 9 | 8 | PS | 7 | PS | 6 | Al | 4 | Al | 45 | 153 | 0 | 41 |
| IE 10 | 9 | PS | 6 | Al | 6 | Al | 5 | Al | 40 | 141 | 1 | 41 |
| IE 11 | 4 | PS | 5 | PS | 1 | nd | 1 | nd | 55 | 263 | 0 | 41 |
| CE1 | 1 | PS | nd | nd | 1 | PVC | nd | nd | 55-60 | 158 | 0 | 79 |
| CE2 | 6 | Both sides | 7 | partial | 5 | partial | 6 | partial | <35 | 78 | −15* | 56* |
| CE3 | 3 | Al | | | 1 | partial | | | 60 | 155 | 43 | 41 |

Glass transition temperatures indicated by "*" have been taken from WO2011017388. The "HSF" column in the table states the heat sealing strength values measured with respect to polystyrene (PS) and polyvinyl chloride (PVC). The column headed "H₂O" describes the heat sealing strength values after exposure to water. The "Blocking point" column indicates the blocking points measured. "Ps" describes the particle size (determined with Beckmann Coulter LS 13320 equipment, the stated values being the d50 from the numerical distribution), and $T_g$ (stage 1) and $T_g$ (stage 2) are the calculated glass transition temperatures of the respective stages. $T_g$ is calculated by using the Fox equation.

Inventive Examples 1-9 and 11 comprise dispersions with identical monomer units but markedly different compositions within the individual stages, and in particular with markedly different stage 1: stage 2 ratios. Nevertheless, despite these wide variations good heat sealing strengths and good blocking resistance values are obtained throughout. In the case of inventive Example 11—with only a small proportion of stage 1—strength values observed with respect to PS after exposure to water are still surprisingly good. Inventive Example 10 shows that it is not essential to use butyl acrylate and that this monomer can be replaced for example by ethyl acrylate, as long as the necessary alterations, which will be understood by the person skilled in the art, are made in the ratios of the individual monomers. However, use of monomers with longer side chains, e.g. n-butyl acrylate or ethylhexyl acrylate, can be expected to give inter aim better water resistance values for the lacquers.

Comparative Example 1 corresponds to the systems of the prior art in accordance with EP 0 574 803, and does not exhibit any significant heat sealing strength values.

Comparative Examples 2 corresponds to Example 2 from WO2011017388. Blocking resistance is inadequate.

Comparative Example 3 exhibits inadequate heat sealing strength values. The glass transition temperature of the first stage is too high.

The invention claimed is:

1. A process, comprising applying a heat-sealing lacquer in a single layer to an aluminum surface prior to performing a sealing process,
wherein the heat-sealing lacquer comprises at least 50% by weight of an aqueous dispersion comprising:
a first polymer phase having a glass transition temperature of from −10 to 25° C.; and
a second polymer phase having a glass transition temperature of from 30 to less than 45° C., and comprising from 2 to 10% by weight of at least one acid copolymerizable with methacrylates, based on a total weight of the first polymer phase and the second polymer phase,
wherein the aqueous dispersion is formed by emulsion polymerization, such that:
a first monomer mixture, which forms a polymer having a glass transition temperature of from −10 to 25° C., is initially polymerized; and after polymerization of the first monomer mixture
a second monomer mixture, which forms a polymer having a glass transition temperature of from 30 to less than 45° C. is added, and polymerized,
to form a core-shell particle comprising the first polymer phase and the second polymer phase.

2. The process of claim 1, wherein the aqueous dispersion comprises from 15 to 64% by weight of polymers comprising:
from 25 to 78% by weight of an alkyl ester of methacrylic acid;
from 4 to 40% by weight of an alkyl ester of acrylic acid;
from 2 to 9% by weight of the at least one acid copolymerizable with methacrylates; and
up to 20% by weight of at least one other monomer copolymerizable with (meth)acrylates, but which is not a (meth)acrylate,
based on the total weight of the first polymer phase and the second polymer phase.

3. The process of claim 1, wherein polymers in the aqueous dispersion comprise from 49 to 65% by weight of an alkyl ester of methacrylic acid; from 17 to 30% by weight of an alkyl ester of acrylic acid; from 3 to 8% by weight of (meth)acrylic acid; and from 8 to 15% by weight of styrene, based on the total weight of the first polymer phase and the second polymer phase.

4. The process of claim 1, wherein polymers in the aqueous dispersion further comprise from 2 to 12% by weight of an alkyl ester of (meth)acrylic acid having at least one other functional group, based on the total weight of the first polymer phase and the second polymer phase.

5. The process of claim 4, wherein the alkyl ester of (meth)acrylic acid having at least one other functional group comprises hydroxyethyl (meth)acrylate, and an amount of the hydroxyethyl (meth)acrylate in the polymers is from 3 to 7% by weight, based on the total weight of the first polymer phase and the second polymer phase.

6. The process of claim 4, wherein the alkyl ester of (meth)acrylic acid having at least one other functional group comprises hydroxyethyl (meth)acrylate, and an amount of the hydroxyethyl (meth)acrylate in the polymers is from 4 to 6% by weight, based on the total weight of the first polymer phase and the second polymer phase.

7. The process of claim 1, wherein polymers of the aqueous dispersion comprise: from 37 to 70% by weight of methyl methacrylate, butyl methacrylate, or both, from 12 to 35% by weight of a $C_1$-$C_4$-alkyl ester of acrylic acid; from 3 to 7% by weight of a hydroxy-functional (meth)acrylate; from 2 to 9% by weight of (meth)acrylic acid; and from 4 to 20% by weight of styrene, based on the total weight of the first polymer phase and the second polymer phase.

8. The process of claim 7, wherein the polymers comprise: from 49 to 65% by weight of the methyl methacrylate, the butyl methacrylate, or both; from 20 to 30% by weight of the $C_1$-$C_4$-alkyl ester of acrylic acid; from 4 to 6% by weight of the hydroxy-functional (meth)acrylate; from 5 to 7% by weight of the (meth)acrylic acid; and from 8 to 15% by weight of the styrene, based on the total weight of the first polymer phase and the second polymer phase.

9. The process of claim 1, wherein:
the first monomer mixture comprises one or more hydroxy-functional (meth)acrylates;
the second monomer mixture comprises a carboxylic acid copolymerizable with (meth)acrylates; and
a ratio by weight of the first monomer mixture to the second monomer mixture ranges from 1:9 to 8:2.

10. The process of claim 1, wherein the second monomer mixture is polymerized in the presence of a chain-transfer agent.

11. The process of claim 1, wherein the heat-sealing lacquer is effective to seal aluminum surfaces with respect to styrene, Polyethylene terephthalate, Polylactic acid, or Polyvinyl chloride.

12. The process of claim 1, wherein the second monomer mixture is polymerized in the presence of 0.2% by weight of n-dodecyl mercaptan as a chain-transfer agent, based on the total weight of the first polymer phase and the second polymer phase.

* * * * *